Feb. 13, 1962 W. J. KOCH 3,020,619
FIRING PROCESS FOR FORSTERITE CERAMICS
Filed Dec. 7, 1959

INVENTOR.
William J. Koch
BY
W.S. Hill
AGENT

3,020,619
FIRING PROCESS FOR FORSTERITE CERAMICS
William J. Koch, Livingston, N.J., assignor to Radio Corporation of America, a corporation of Delaware
Filed Dec. 7, 1959, Ser. No. 857,479
4 Claims. (Cl. 25—157)

This invention relates to an improved process of making ceramic parts and, more particularly, to an improved firing process for making shaped articles of forsterite ceramic compositions.

Ceramic parts used in industries such as the electron tube manufacturing industry must often meet rigid specifications with regard to properties such as porosity, flexural strength, and thermal expansion. This is particularly true of ceramic parts intended for use in certain vacuum tubes having relatively small dimensions and very close dimensional tolerances. A particular type of electron vacuum tube utilizes a ceramic stem. The manufacture of the stem will be discussed more fully hereinafter by way of example but the same considerations and the same process would, of course, apply to the manufacture of many different ceramic parts having varied uses.

The ceramic stem used in one model of the recently developed vacuum tube known as the Nuvistor is a disc having a diameter of about 0.400"±.002" and a height of about 0.065"±.002". The disc is pierced with 11 holes each having a diameter of about 0.0175" to 0.0180". This disc must have relatively low internal porosity, high flexural strength, and a particular coefficient of thermal expansion matching closely that of the metal envelope to which it is to be hermetically sealed. Since this disc must be joined to several metal parts, it is desirable that it be easily coated with a thin, adherent metal coating. The metal coating must withstand high temperatures.

Because of the coefficient of expansion required and the other desirable properties they must have, these ceramic discs are presently made of forsterite ceramics having the major crystalline phase $2MgO \cdot SiO_2$. Since no natural mineral is known having the exact composition of forsterite ceramics, the material is made synthetically. It may be made, for example, from a composition consisting of Montana talc ($3MgO \cdot 4SiO_2 \cdot H_2O$) 51.25%, fused MgO 27.12%, Clinchfield feldspar (potash feldspar), 7.81%, Kentucky Special ball clay ($Al_2O_3 \cdot SiO_2 \cdot 2H_2O$) 4.72%, and $BaCO_3$ (precipitated) 9.10%.

The above ingredients are blended by ball milling with an organic milling medium as disclosed in application Serial No. 857,478, filed December 7, 1959, of Lawrence P. Garvey. After blending and dispersing the particles as described in the above-mentioned application, the material is dried and then mixed with organic materials which serve as plasticizers, binders and lubricants, and again thoroughly blended.

A suitable ingredient for the organic material portion is polyethylene glycol, one form of which is commercially available as Carbowax 4000. Another suitable ingredient for the organic material portion is trigamine stearate. A molding composition is prepared by mixing 3000 g. of the dried material, ball-milled as above described, 120 g. Carbowax 4000, 45 g. trigamine stearate, and 900 cc. water. This composition is mixed in a Simpson mixer for about 40 minutes to make the mixture moldable. The mixture is dried for 2 hours at 75° C., shredded in a Hobart food chopper, and dried again for about 1 hour at 75° C. The mixture is then placed in a Stokes oscillating granulator and the material is forced through a 20 mesh screen. The material is then dried and placed in a gyratory sifter to select the fraction which passes through a 40 mesh screen but is retained on a 100-mesh screen. The selected fraction is dried overnight at 75° C.

The dried material, made as above-described, is then compression-molded into small discs. The unfired discs have a diameter of 0.452" and a height of 0.076–0.078". Eleven holes, each having a diameter of 0.0205" are molded into the disc. The pressed weight of each disc is .4478 gram and the pressed density is 2.29 grams per cc.

The normal firing schedule of these bodies was air-firing for 12–24 hours. Air-firing is necessary to burn off the organic binders and lubricants which are a necessary part of the composition. However, it was found that air-firing did not produce a completely satisfactory product using relatively short firing schedules. Using short firing schedules, i.e., under two hours, for the final firing, the internal porosity could not be made low enough to obtain a sufficiently high density. Consequently, properties such as flexural strength were often not high enough and, because of the too high porosity, metallizing usually could not be properly carried out so that the metallic coat was sufficiently uniform. Moreover, under microscopic examination, the forsterite crystals often did not appear to be well-formed, some streamers of glass could be seen in the fired body, the body appeared to be laminated rather than homogeneous throughout, and there were relatively large internal pores.

Another disadvantage of air-firing was the undesirably long firing time involved. The firing time of 12–24 hours was too long for economical production.

Air-firing appeared to be unfeasible in obtaining a completely satisfactory product using a desirably short firing cycle.

The principal object of the present invention is to provide an improved firing process for forsterite ceramics which results in the uniform production of ceramic parts having very low porosity, improved flexural strength, and low thermal expansion.

A further object of the invention is to provide an improved firing process for making forsterite ceramics in which the firing time is greatly shortened compared to the normal firing times usually associated with the manufacture of this type of ceramic.

A particular feature of the present invention is the discovery that forsterite ceramic parts having the desirable properties mentioned above can be made by first, firing the parts for a relatively short period of time in an air or other oxidizing atmosphere until loss on ignition due to burning off of the organic matter and driving off of water of crystallization and other volatiles is complete, and then firing for a relatively short period of time in a non-oxidizing atmosphere until the product is completely vitrified. The total time elapsed in the double-firing process is relatively short.

The drawing is a graphical representation of a typical example of the process of firing forsterite compositions in accordance with the present invention as applied to the making of small ceramic discs.

Figure 1A:
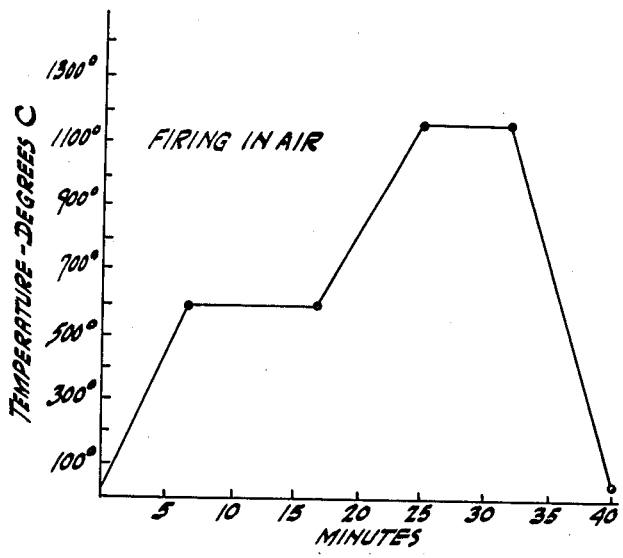
FIG. 1a is a firing schedule for the first firing in air.
Figure 1B:
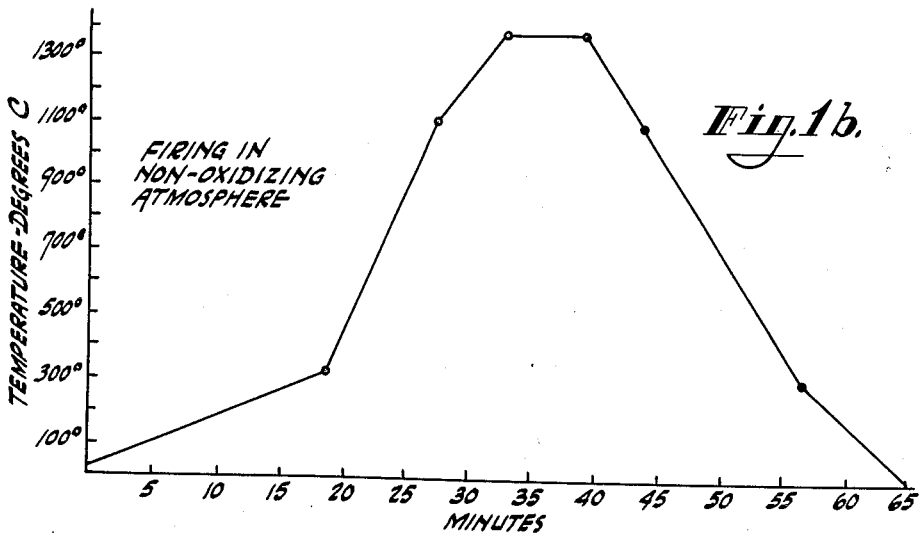
FIG. 1b is a firing schedule for the second firing in a non-oxidizing atmosphere.

A specific example of the firing process, as applied to the ceramic discs above-described, will now be given. The furnace used was a laboratory tubular type having inside diameter of 2" and a length of 50". It was heated by globars. Provision was made for introducing gas atmospheres as desired and apparatus was also utilized for pushing parts to be manufactured through the furnace at a desired rate of travel. Only the center 5" of the furnace is heated to maximum temperature. For the first firing, the pressed discs are placed on porous alumina setters. With the furnace brought up to temperature, and the atmosphere within the furnace being air, the following firing schedule was used.

Room temperature to 600° C.—7 minutes
At 600° C.—10 minutes
600° C. to 1150° C.—8 minutes
At 1150° C.—7 minutes
1150° C. to room temperature—8 minutes This first firing in air serves to oxidize and burn-off all of the binders and lubricants and it also drives off all the water of crystallization and other volatile ingredients.

These parts which have been given a first firing, as described above, are then given a second firing as follows in the same type of furnace with an atmosphere of 90% nitrogen-10% hydrogen, by volume.

Room temperature to 300° C.—18 minutes
300° C. to 1100° C.—9 minutes
1100° C. to 1375° C.—5 minutes
At 1375° C.—6½ minutes
1375° C. to 1100° C.—5 minutes
1100° C. to 300° C.—13 minutes
300° C. to room temperature—8 minutes.

Using commercial production schedules, the above second firing schedule can be shortened considerably. For example, parts can be brought from room temperature to 1100° C. in about 9 minutes followed by the same maximum heat schedule and can be taken from 1100° C. back down to room temperature in about 13 minutes.

The fired pieces have the following dimensions: diameter—0.400"±.002"; height—0.066"±.002". The parts have a fired density of 2.94–3.02 grams per cc. The diameter of each of the 11 small holes is now .0175" to .0180".

The ceramic parts made by the process described above have all of the properties as to density, flexural strength, thermal conductivity, and thermal expansion required for use in the newly developed vacuum tubes. They also can be metallized uniformly so that metal parts can be brazed thereto. Compared to parts which had been previously made by air-firing alone, the parts made in accordance with the present invention have improved properties. Average modulus of rupture of parts made by air-firing only (parts having a firing schedule of 24 hours)—22,000–22,500 lbs. per square inch. Parts made as above described have an average modulus of rupture of 25,500 lbs. per square inch. Parts which were rapidly air-fired using a schedule similar to that given above for the improved process of the present invention never got below a diameter of 0.406" and most of them had diameters between 0.410" and 0.412". Parts made in accordance with the processes of the invention have average diameters of 0.400"±0.002". The reduction in diameter is a measure of the increased density and lower porosity of the improved product. Thermal expansion coefficient of the bodies between 25° C. and 925° C. is between $114 \times 10^{-7}$ and $116 \times 10^{-7}$ in./in./° C. Under microscopic examination, parts made in accordance with the present invention showed well-formed crystals, little or no unreacted MgO, good homogeneity, no laminations and small internal pores. The reasons for the improved results obtained with the present process are not entirely understood. The improvements may be due to a lowering of surface tension of the forsterite and glass particles or to other causes. But, whatever the reasons, the improved firing process has resulted in uniform production of parts having the properties needed for their intended use.

Certain variations can be made in the improved process of the invention without departing from the scope thereof. Firing time of the first firing in air will depend considerably on the percentage of the binders and lubricants present as well as the sizes of the parts being made. Under any circumstances, it is simply necessary to fire long enough to drive off substantially all volatile substances and oxidize all organic matter. Moreover, the parts need not be cooled down to room temperature before going to the second firing step. After loss on ignition is complete, the parts may be advanced directly to the next firing step and brought to maximum firing temperature.

Attempts have been made to eliminate the first firing in air, without success. Without the first firing in air or other oxidizing atmosphere, the parts become blistered and bloated and the organic matter is converted to carbon which remains distributed throughout the part, changing its physical properties and electrical properties.

Certain variations can also be made in the second firing step. The atmosphere which was used in the above example for the second firing was 90% nitrogen and 10% hydrogen. This is known as forming gas and is easily available in industrial operations at low cost. Other non-oxidizing atmospheres can be used, however. Parts were made equally well in vacuum, or in argon or helium or mixtures of the two, or in hydrogen containing sufficient water vapor to inhibit reduction of the ceramic composition to metal. Actually, somewhat better results were obtained using a wet hydrogen atmosphere but dry hydrogen caused some of the compounds to be reduced partially to the metallic state which is undesirable. The wet hydrogen atmosphere was obtained by bubbling hydrogen at the rate of 12 cubic feet per hour through water maintained at 26°–32° C. The rate of bubbling was varied between 10–14 cubic feet per hour without noticing any substantial change in the fired products.

The rate at which the parts were brought up to maximum firing temperature in the second firing step was found to be significant within limits. The maximum rate of temperature rise possible was found to be about 100° C. per minute and it was found preferable to maintain the bodies within the 1100° to 1375° C. range for at least 5 minutes so that the bodies would be fired uniformly.

The maximum firing temperature during the second firing step can be varied somewhat but not a great deal unless other conditions are changed. Using alumina setters, when the maximum temperature was raised to 1400° C., small cracks formed throughout the pieces. These did not form at 1385° C. At 1365° C., the time required at the maximum temperature was about ½ hour and since short firing time is one of the objectives here, it is apparent that decrease in the maximum temperature below about 1375° C. is not desirable even though somewhat lower temperatures are operative. To achieve a desirably short firing time of 5–10 minutes at the maximum firing temperature, the maximum firing temperature should be about 1375°–1390° C.

What is claimed is:

1. In a method of making ceramic parts of approximately forsterite composition, having relatively high density and high modulus of rupture, the process comprising preparing a blended and dried mixture of talc ($3MgO \cdot 4SiO_2 \cdot 2H_2O$), fused MgO, potash feldspar, ball clay ($Al_2O_3 \cdot SiO_2 \cdot 2H_2O$) and precipitated $BaCO_3$, mixing the blended mixture with organic plasticizers, binders and lubricants to prepare a molding composition, molding parts of said composition, subjecting said molded parts to a first firing in air to burn off substantially all organic matter and to drive off substantially all volatile matter, and then subjecting said parts to a second firing for a relatively brief period of time in a non-oxidizing atmosphere until said parts are completely vitrified, said second firing including maintaining said parts at a maximum temperature of about 1375° to 1390° C. for about 5 to 10 minutes.

2. In a method of making ceramic parts of approximately forsterite composition, having relatively high density and high modulus of rupture, the process comprising preparing a blended and dried mixture of talc, fused MgO, potash feldspar, ball clay and barium carbonate, mixing the blended mixture with organic plasticizers, binders and lubricants to prepare a molding composition, molding parts of said composition, subjecting said molded parts to a first firing in air to burn off substantially all organic matter and to drive off substantially all volatile matter, and then subjecting said parts to a second firing for a relatively brief period of time in an atmosphere consisting essentially of 90% nitrogen and 10% hydrogen by volume until said parts are completely vitrified, said second firing including maintaining said parts at a maximum temperature of about 1375° to 1390° C. for about 5 to 10 minutes.

3. In a method of making ceramic parts of approximately forsterite composition, having relatively high density and high modulus of rupture, the process comprising preparing a blended and dried mixture of talc, fused magnesium oxide, potash feldspar, ball clay and precipitated barium carbonate, mixing the blended mixture with organic plasticizers, binders and lubricants to prepare a molding composition, molding parts of said composition, subjecting said molded parts to a first firing in air to burn off substantially all organic matter and to drive off substantially all volatile matter, and then subjecting said parts to a second firing in a wet hydrogen atmosphere until said parts are completely vitrified, said second firing including maintaining said parts at a maximum temperature of about 1375° to 1390° C. for about 5 to 10 minutes.

4. In a method of making ceramic parts of approximately forsterite composition, having relatively high density and high modulus of rupture, the process comprising preparing a blended and dried mixture of talc, fused magnesium oxide, potash feldspar, ball clay and precipitated barium carbonate, mixing the blended mixture with organic plasticizers, binders and lubricants to prepare a molding composition, subjecting said molded parts to a first firing in air to burn off substantially all organic matter and to drive off substantially all volatile matter and then subjecting said parts to a second firing for a relatively brief period of time in a nonoxidizing atmosphere until said parts are completely vitrified, said second firing including maintaining said parts at a maximum temperature of about 1375° to 1390° C. for about 5 to 10 minutes, and raising and lowering the temperature up to the maximum and back down to room temperature at a rate not exceeding about 100° C. per minute.

References Cited in the file of this patent

UNITED STATES PATENTS

| | | |
|---|---|---|
| 1,528,759 | Fallon | Mar. 10, 1925 |
| 2,369,266 | Thurnauer | Feb. 13, 1945 |
| 2,626,445 | Albers-Schoenberg | Jan. 27, 1953 |
| 2,912,340 | Pincus | Nov. 10, 1959 |

FOREIGN PATENTS

| | | |
|---|---|---|
| 618,094 | Germany | Sept. 4, 1935 |